United States Patent [19]

Link

[11] Patent Number: 5,042,167

[45] Date of Patent: Aug. 27, 1991

[54] OIL DIPSTICK GUIDE

[75] Inventor: Paul A. Link, Wisconsin Rapids, Wis.

[73] Assignee: Pal Products, Inc., Wisconsin Rapids, Wis.

[21] Appl. No.: 609,821

[22] Filed: Nov. 6, 1990

[51] Int. Cl.$^5$ .......................................... G01F 23/04
[52] U.S. Cl. ...................................... 33/725; 33/726
[58] Field of Search ................................. 33/721–731; 15/210 B

[56] References Cited

U.S. PATENT DOCUMENTS

| | | |
|---|---|---|
| 3,474,884 | 10/1969 | Braun . |
| 3,735,494 | 5/1973 | Gumtow . |
| 4,155,167 | 5/1979 | DeLano . |
| 4,640,126 | 2/1987 | Jansch . |
| 4,780,925 | 11/1988 | Sherman ........................... 33/726 X |
| 4,860,401 | 8/1989 | Deveaux . |
| 4,894,926 | 1/1990 | Suhr . |
| 4,942,669 | 7/1990 | Schnedl ........................... 33/726 X |

FOREIGN PATENT DOCUMENTS

| | | | |
|---|---|---|---|
| 1135673 | 8/1962 | Fed. Rep. of Germany ........ 33/725 |
| 2547177 | 5/1977 | Fed. Rep. of Germany ........ 33/725 |
| 1099373 | 9/1955 | France ................................. 33/722 |

Primary Examiner—Harry N. Haroian
Attorney, Agent, or Firm—Foley & Lardner

[57] ABSTRACT

An oil dipstick guide which is a funnel-shaped guide mounted about the dipstick tube of a typical combustion engine. The guide has a circular lip on which an oil dipstick can be balanced when inserting the tip of the dipstick into the oil dipstick tube.

2 Claims, 6 Drawing Sheets

OIL DIPSTICK GUIDE

TECHNICAL FIELD

The present invention relates, generally, to a device for guiding an oil dipstick into an oil dipstick tube and, in particular, to a funnel-shaped guide which attaches to the dipstick tube near its open end.

BACKGROUND ART AND TECHNICAL PROBLEMS

Devices which employ a thin, elongated dipstick for measuring the oil level in a crankcase of an internal combustion engine are generally well known. See, for example, Jansch U.S. Pat. No. 4 640 126, issued Feb. 3, 1987; Braun U.S. Pat. No. 3,474, 884 issued Oct. 28, 1969; and Suhr U.S. Pat. No. 4,894,926, issued Jan. 23, 1990.

Such devices typically include an oil dipstick tube extending from the oil crankcase to the exterior of the engine. A dipstick is configured for sliding receipt within the dipstick tube such that a distal end of the dipstick extends into the crankcase when the dipstick is seated in the dipstick tube.

To aid the operator in aligning the distal end of the dipstick with the open end of the dipstick tube into which the dipstick is to be inserted, some presently known devices provide a dipstick tube having a flared end portion which diverges outwardly, forming an enlarged open end, the inside surface of the enlarged portion being continuous with the inside diameter of the rest of the dipstick tube. Once the distal end of the dipstick is positioned within the enlarged portion of the dipstick tube, the dipstick may be easily guided along the inside surface of the enlarged portion and into the dipstick tube.

For example, Delano U.S. Pat. No. 4,155,167, issued May 22, 1979, discloses a guide element which is urged downwardly against a biasing spring, such that the dipstick tube extends above the guide element when the dipstick is seated within the dipstick tube. When the dipstick is removed from the tube, however, the guide element forms a continuous surface with the inside diameter of the dipstick tube, i.e., the dipstick tube does not remain extended above the upper surface of the guide element. Impurities such as dirt, dust and the like which collect on the upper surface of the guide element can enter the crankcase through the dipstick tube.

SUMMARY OF THE INVENTION

The present invention provides a funnel-shaped guide through which the distal end of a standard OEM oil dipstick tube extends. In accordance with a preferred embodiment of the present invention, the guide comprises an enlarged open end which converges at a throat portion having an inner diameter approximately equal to the outer diameter of the dipstick tube. The dipstick tube is inserted into the throat portion of the guide and retained by a collar. The guide is positioned such that a portion of the dipstick tube extends into the region defined by the diverging surface of the guide. In this way, debris which tends to accumulate within the guide cannot enter the dipstick tube and, thus, cannot enter the crankcase.

BRIEF DESCRIPTION OF THE DRAWING

Preferred exemplary embodiments of the present invention will now be described in conjunction with the appended drawings, wherein like numerals denote like elements, and.

DETAILED DESCRIPTION OF A PREFERRED EXEMPLARY EMBODIMENT

Figure 1:
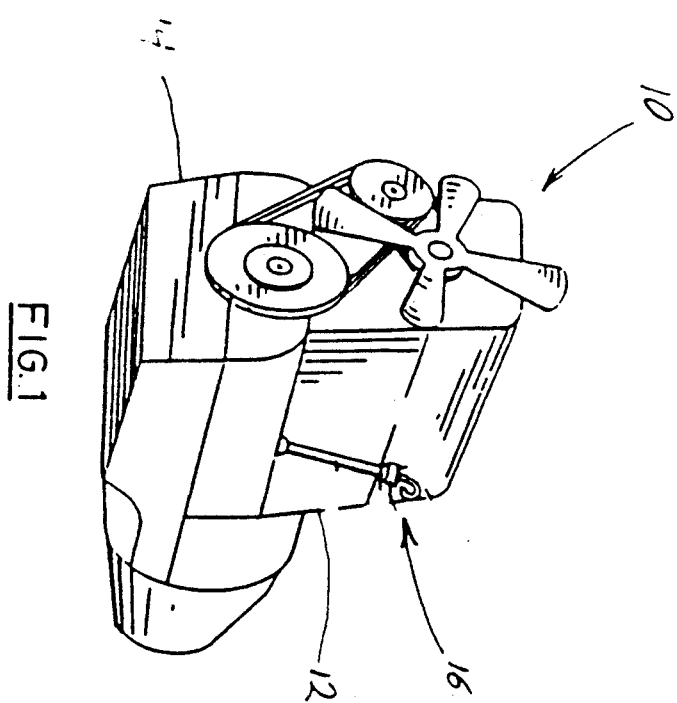
FIG. 1 is a perspective view of a conventional internal combustion engine having a standard dipstick tube assembly as is well-known in the art.

Referring now to FIG. 1, an internal conventional combustion engine 10 comprises a cylinder block 12, a crankcase 14, and a dipstick assembly 16 mounted to the external surface of engine 10.

Figure 2:
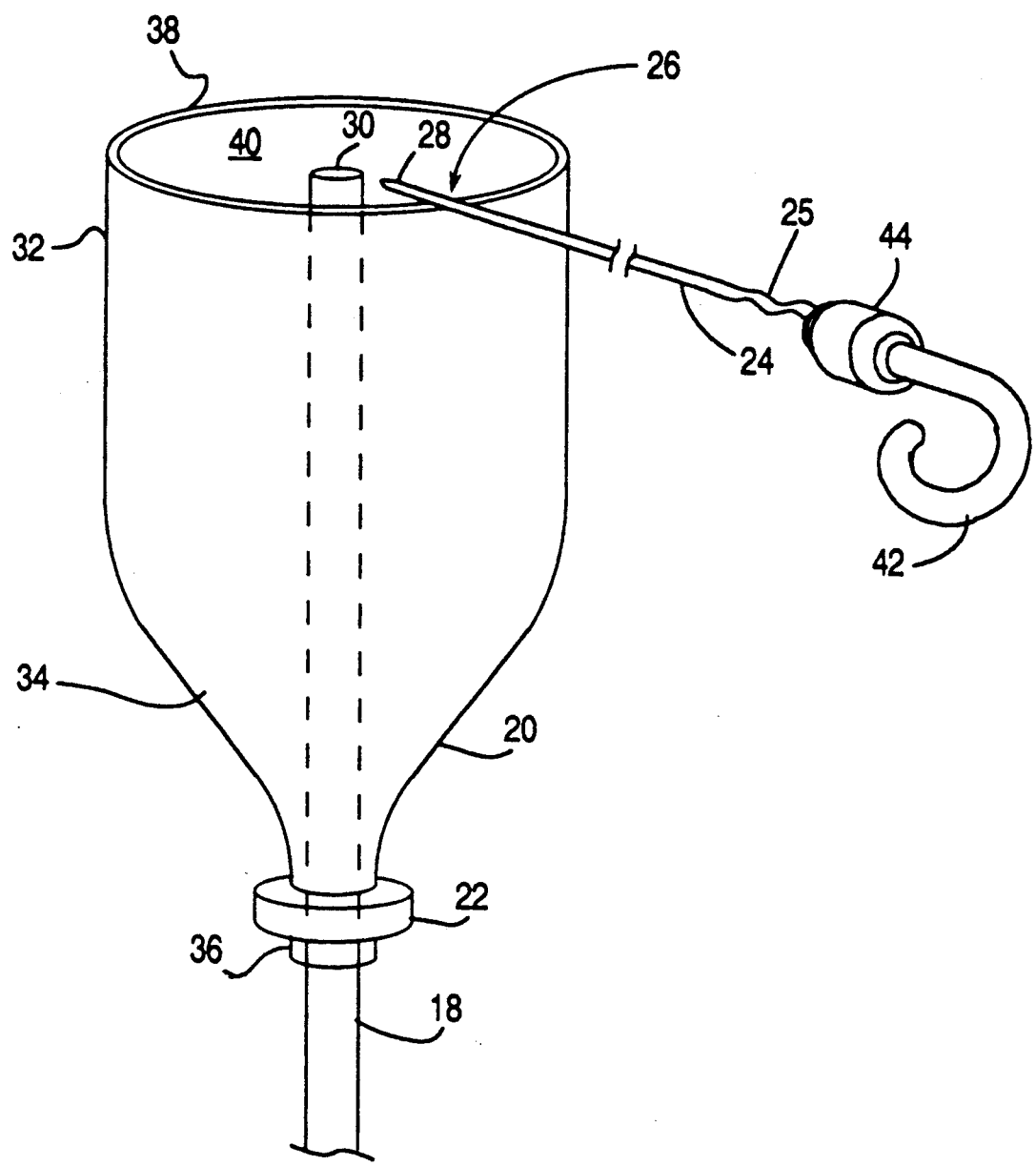
FIG. 2 is a perspective view of the upper end of a dipstick tube, having a guide retained thereto in accordance with the present invention, showing the dipstick resting on the guide.
Figure 3:
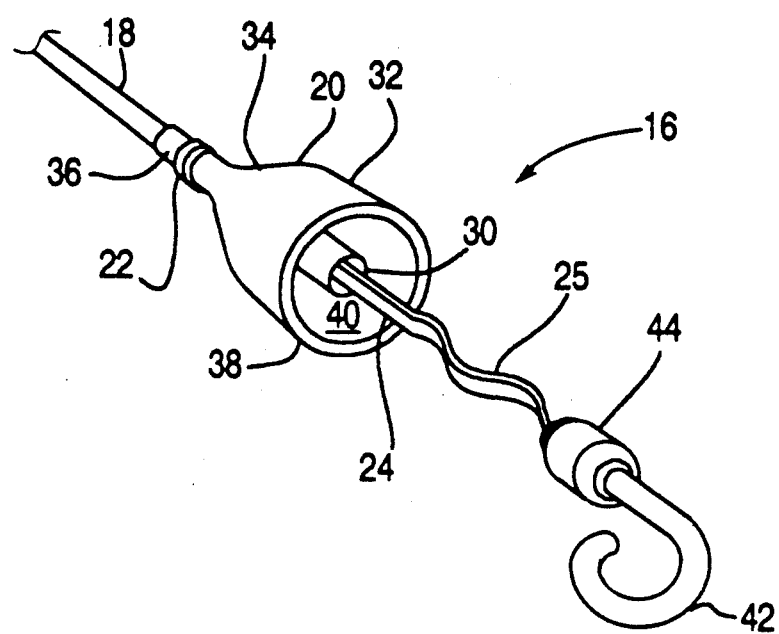
FIG. 3 is a perspective view of a dipstick tube having a guide secured thereto and showing the dipstick being inserted into the dipstick tube.
Figure 4:
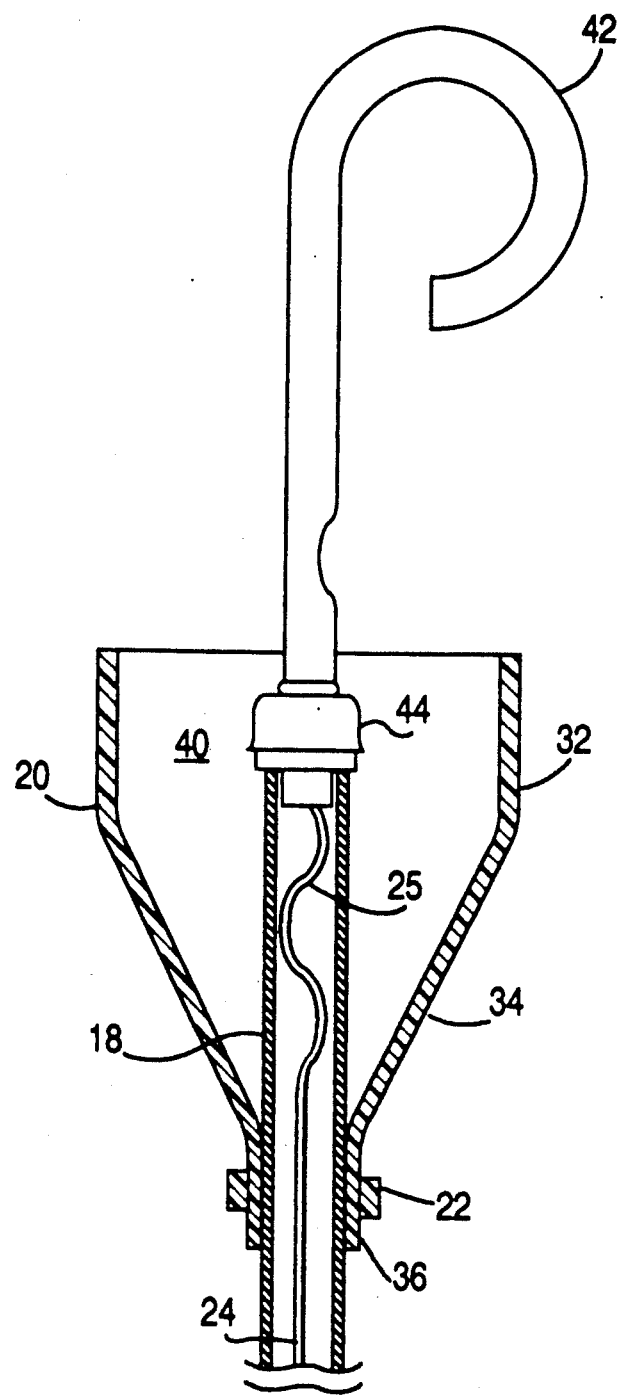
FIG. 4 is a cross section view of an exemplary embodiment of a dipstick tube and guide in accordance with the present invention.

With reference to FIGS. 2-4, dipstick assembly 16 in accordance with a preferred exemplary embodiment of the present invention includes a dipstick tube 18, a dipstick 24, a funnel-shaped guide 20, and a retaining collar 22. Dipstick tube 18 and dipstick 24 may comprise standard equipment of the type typically found on OEM vehicles. More particularly, tube 18 comprises a rigid, hollow conduit having an upper, open end 30 disposed remote from crankcase 14 and a lower end (not shown) terminating within crankcase 14. Dipstick 24 may comprise a thin, flat, resiliently flexible probe configured for removable receipt within tube 18, as is well known in the art. A series of convoluted bends 25 in dipstick 24 frictionally engage the inside wall of dipstick tube 18 to hold dipstick 24 in place when inserted into dipstick tube 18.

Dipstick assembly 16 is configured such that, when dipstick 24 is seated within dipstick tube 18, a distal end 28 of dipstick 24 extends into crankcase 14 and into the supply of oil resident therein. Upon removal of dipstick 24 from dipstick tube 18, the level of oil in crankcase 14 may be ascertained by observing the extent to which dipstick 24 is wetted with oil and comparing the wetted portion with preprinted markings (not shown) on a flat surface of dipstick 24.

A cap 44, affixed to dipstick 24, slidably engages and covers open end 30 of dipstick tube 18 when dipstick 24 is seated within dipstick tube 18. Adjacent to cap 44 is a handle 42 which facilitates the removal and handling of dipstick 24.

Guide 20 suitably comprises an enlarged portion 32, and a converging surface 34 terminating at a throat 36. Enlarged portion 32 terminates at a lip 38 which may be circular. Enlarged portion 32, converging surface 34, and lip 38 generally define an internal region 40.

Guide 20 is advantageously made from any suitable heat resistant material, for example polyethylene, pvc, polyeurethane, nylon, and various copolymers thereof. In addition, guide 20, and particularly throat 36 thereof, may be resiliently flexible to facilitate insertion of dipstick tube 18 thereinto.

Guide 20 may be retained about dipstick tube 18 by a collar 22, for example a plastic retaining fastener of conventional construction. Alternatively, collar 22 may comprise a strap clamp, zip tie or any fastener configured to apply sufficient pressure, about the circumferential surface of resiliently flexible throat 36, to maintain static frictional engagement between the inside wall of throat 36 and the exterior of dipstick tube 18.

In a particularly preferred embodiment, guide 20 is secured to dipstick tube 18 such that a portion of the distal end of tube 18 extends into internal region 40 so that opening 30 is spaced upwardly from throat 36. In this way, debris which may tend to accumulate in guide 20, for example dirty oil, water, dust and objects inadvertently dropped into guide 20, is prevented from entering opening 30 and, concomitantly, crankcase 14. As explained in greater detail below, opening 30 is also desirably disposed below lip 38.

After the operator has removed dipstick 24 from dipstick tube 18 for inspection of the oil level, it is necessary to replace dipstick 24 within dipstick tube 18. The location of dipstick tube 18 and the length and flexibility of dipstick 24, however, render it difficult to accurately position distal end 28 of dipstick 24 within opening 30 of dipstick tube 18, especially when the operator holds dipstick 24 by its handle 42.

In a preferred embodiment of the invention, opening 30 extends above throat 36 up to approximately six (6) inches, and preferably about ¼" to three (3) inches. Additionally, opening 30 is preferably dispose below lip 38 so that distal end 28 of dipstick 24 can be brought into engagement with opening 30 while dipstick 24 is in contact with lip 38. In a highly preferred embodiment, opening 30 is ¼" to one (1) inch below lip 38. The operation of dipstick assembly 16 will now be described in conjunction with FIG. 2.

In accordance with a preferred exemplary implementation of dipstick assembly 16, the operator first rests dipstick 24, at a point proximate distal end 28, upon any convenient point of lip 38, as shown by arrow 26. This stabilizes dipstick 24 and allows precise control of distal end 28 thereof. The point defined at position 26 functions as a fulcrum, such that very large movements at handle 42 are translated into very small movements at distal end 28. Having stabilized dipstick 24 in the foregoing manner, the operator may precisely guide distal end 28 into opening 30. Once distal end 28 is inserted into opening 30, it is no longer necessary to maintain contact between dipstick 24 and lip 38 (at position 26), and the operator may simply slide dipstick 24 into dipstick tube 18 until cap 44 seats on opening 30, as is conventional in the art.

Figure 5:
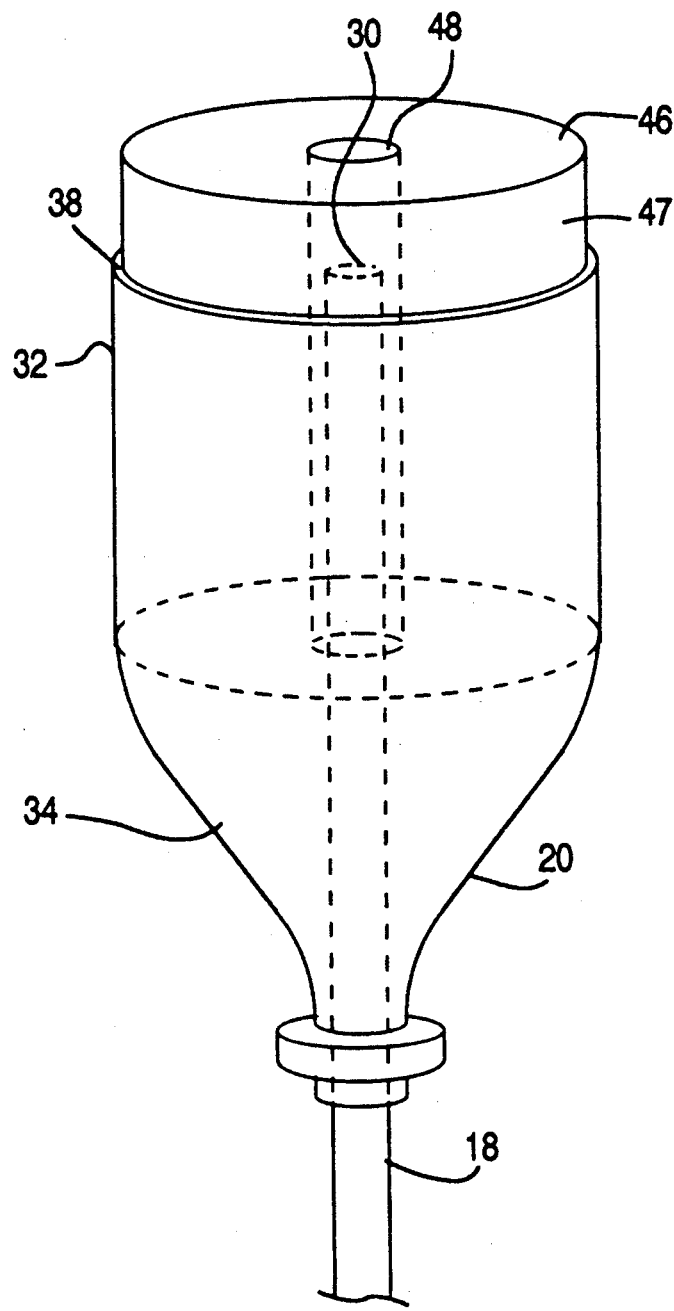
FIG. 5 is an alternate embodiment showing a sponge inserted within the guide.
Figure 6:
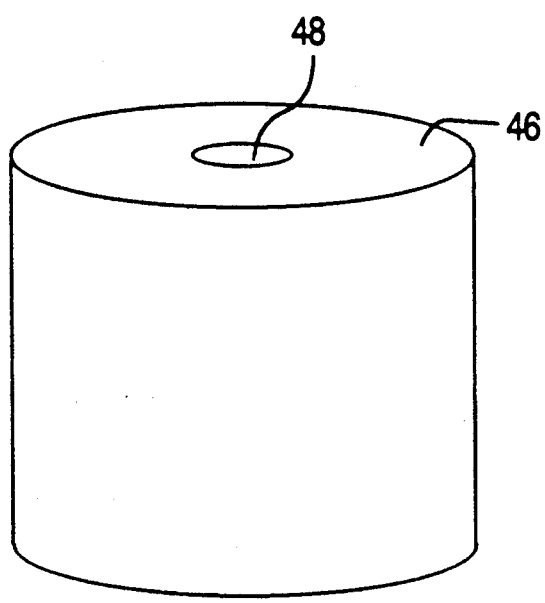
FIG. 6 is a perspective view of a sponge in accordance with the present invention.

In an alternative embodiment as shown in FIG. 5, a sponge 46 is inserted into internal region 40 so that a portion 47 of Sponge 46 extends above lip 38. Sponge 46 is generally cylindrical in shape and has a circular passage 48 which passes axially through its center. Dipstick tube 18 extends into circular passage 48 and sponge 46 is held in place by friction when pressed into place in internal region 40. Alternatively, if circular passage 48 is of appropriate diameter, it can be pressure fit around dipstick tube 18 alone or in combination with the friction fit of sponge 46 in internal region 40. The diameter of sponge 46 is slightly greater than the internal diameter of enlarged portion 32 so that frictional forces are sufficient to hold sponge 46 in place but not so great as to prevent easy replacement of sponge 46.

Sponge 46 is made from a pliable absorptive material that will absorb oil. When dipstick 24 is removed from dipstick tube 18, sponge 46 will remove the oil from dipstick 24 where it rubs against sponge 46. To facilitate excess oil removal from dipstick 24, sponge portion 47 can be manually squeezed into contact with both sides of dipstick 24. Once sponge 46 is saturated with oil, it can be thrown away and replaced with a new sponge.

It will be understood that the above description is of a preferred exemplary embodiment of the present invention and that the invention is not limited to the specific form shown. For example, guide 20 may be any convenient shape, for example elliptical, or rectangular, provided that a surface is available to stabilize the dipstick prior to inserting the distal end of the dipstick into the dipstick tube. This and other modifications may be made in the design and arrangement of the components without departing from the spirit of the invention as expressed in the appended claims.

I claim:

1. An oil level detection apparatus, comprising:
   an elongated dipstick tube having a first end disposed within a crankcase of an internal combustion engine and a second end disposed remote from said first end;
   a dipstick configured for sliding receipt within said dipstick tube;
   a guide having a throat, a lip substantially defining an enlarged opening remote from said throat, and a diverging surface spanning said throat and said enlarged opening and defining an internal region within said guide, said diverging surface terminating at said lip;
   means for securing said throat to said dipstick tube in the vicinity of said second end of said dipstick tube such that a portion of said dipstick tube including said second end thereof extends through said throat and into said internal region intermediate said lip and said throat; and
   a sponge, having an axial passage through its center, disposed within said internal region in frictional engagement with a portion of said diverging surface so that said dipstick tube extends into said axial passage, such that a portion of said sponge is squeezable into contact with said dipstick.

2. The apparatus of claim 1, wherein said second end of said dipstick tube extends one-quarter inch to one inch below said lip.

* * * * *